United States Patent [19]
Slama

[11] Patent Number: 5,883,180
[45] Date of Patent: Mar. 16, 1999

[54] WATER BORNE PAINT COMPOSITION

[75] Inventor: Francis J. Slama, Kendall Co., Ill.

[73] Assignee: Finishes Unlimited, Inc., Sugar Grove, Ill.

[21] Appl. No.: 554,932

[22] Filed: Nov. 9, 1995

[51] Int. Cl.$^6$ ............................................. C08L 53/00
[52] U.S. Cl. ..................... 524/505; 524/509; 524/513; 524/516
[58] Field of Search .................... 524/505, 509, 524/516, 513

[56] References Cited

U.S. PATENT DOCUMENTS

| | | | |
|---|---|---|---|
| 2,677,700 | 5/1954 | Jackson et al. | 568/618 |
| 4,521,326 | 6/1985 | Seibert et al. | 252/174.21 |
| 4,764,567 | 8/1988 | Ott | 525/403 |
| 4,921,764 | 5/1990 | Rudd et al. | 428/480 |
| 5,387,304 | 2/1995 | Berner et al. | 156/212 |

*Primary Examiner*—Marion McCamish
*Assistant Examiner*—John J. Guarriello
*Attorney, Agent, or Firm*—Rockey, Milnamow & Katz, Ltd.

[57] ABSTRACT

A water borne, bakable paint composition having a reduced VOC formulated to contain a dispersion of at least one water compatible, film forming cross-linkable resin, a solvent and/or coalescent for the resin in the form of a block copolymer of a copolyetherpolyol and a cross-linking agent for the resin and the copolyetherpolyol in which the cross-linking agent is present in an amount sufficient to cross link the resin and the copolyetherpolyol whereby the latter becomes part of the film when the paint is baked.

18 Claims, No Drawings

WATER BORNE PAINT COMPOSITION

BACKGROUND

The present invention relates to water borne paint composition, and particularly to water borne paint compositions containing copolyetherpolyols.

Environmental regulations restrict the amount of VOC that a paint applicator can emit, and they also restrict the amount of VOC that a paint can carry. Waterborne paints contain solvents and coalescents that contribute to the total VOC. The presence of solvents reduces the viscosity of a water-soluble resin, such as a water-soluble alkyd, thus helping the paint to flow out into an even film during the early stages of baking. In the case of latexes, a coalescent solvent helps the latex particles to fuse together into an even coating before curing has advanced too far. The most common solvents and coalescents used in water-borne paints are monoethers of ethylene glycol, propylene glycol, diethylene glycol, and dipropylene glycol. Formulators of water-borne paint need to utilize these volatile organic compounds, but they try to minimize their levels in order to keep the VOC as low as possible. Any way to reduce the levels of those solvents without affecting other properties of the paint or the baked coating would be an advantage.

Binders and pigments account for most of the solids content of the paint. Paint solids can be described in terms of the weight percent solids or of the volume percent. The volume percent solids is more fundamentally related to the thickness of the dried film (dft). For a given volume of paint applied to a given area, the dft depends on the volume percent solids. Throughput on high-speed paint lines is often limited by the solids content. In such cases, throughput could be increased if the paint had higher volume percent solids. However, the volume percent solids cannot simply be increased by removing some of the water, because then the paint would become too viscous to spray. Any way to increase the volume percent solids without causing a concomitant increase in viscosity would be an advantage.

The organic portion of coatings is susceptible to oxidative degradation in the presence of heat and air. Baked enamels are exposed to such conditions during their normal cure, and oxidative degradation is possible during a normal bake cycle or during overbaking. Some resins become yellow during baking by oxidative degradation. Alkyd resins made using unsaturated oils are especially susceptible to such overbake yellowing. Sometimes an alkyd resin can become sufficiently yellow during normal baking so that it is impossible to use that resin to make a very clean white paint. Antioxidants can help reduce the yellowing, but their effectiveness is limited and somewhat costly. Alkyds made using a saturated oil are much more resistant to oxidative yellowing, but they are more expensive than the more common alkyd resins. It would be advantageous to have a binder that is more resistant to oxidative yellowing than common alkyd resins, that could be used to replace some alkyd resin, and that is not much more expensive than an unsaturated alkyd.

It has been proposed to use copolyetherpolyols in water borne paints as dispersing agents for pigments. Those skilled in the art recognize that the function of such copolyetherpolyols is limited to a dispersant function. The prior art has not recognized that such copolyetherpolyols can be used in large quantities so as to become part of the film deposited on a painted substrate during the baking cycle which is not susceptible to oxidative yellowing as so frequently occurs in the case of, for example, alkyd resin films.

It is accordingly an object of the present invention to provide a water borne paint composition which overcomes the foregoing disadvantages.

It is a more specific object of the present invention to provide a water borne paint composition in which use is made of a non-volatile copolyetherpolyol which can replace at least a portion of the conventionally used water-reducible film forming binders to thereby reduce the viscosity of the paint composition as well as reduce its VOC content.

It is yet another object of the invention to provide a water borne paint composition containing copolyetherpolyols in which the copolyetherpolyols are cross-linked with the film forming binder to become part of the film formed during baking of the painted substrate to provide a coating having improved resistance during baking to oxidative yellowing.

These and other objects and advantages of the present invention appear more fully hereinafter from a detailed description of the invention.

SUMMARY OF THE INVENTION

The concepts of the present invention reside in a water borne bakable paint composition having a reduced VOC which is formulated to contain a conventional dispersion of a water compatible film forming resin and mixed with a block copolymer of a polyol and a lower alkylene oxide and a cross linking agent capable of reaction with the film forming resin and the block copolymers. The cross linking agent is present in the paint composition in amounts sufficient to cross link the resin and the block copolymer whereby the block copolymer becomes an integral part of the film.

It has been found that the use of such copolyetherpolyol block copolymers provide several distinct advantages. Unlike conventional solvents and coalescents, the block copolyetherpolyols used in accordance with the practice of the present invention are non-volatile. As a result, the VOC of paint compositions of this invention are lower than conventional water borne paint compositions. In addition, the block copolyetherpolyols used in the practice of the present invention are less viscous than conventional water reducible binders, permitting the paint compositions of the present invention to be formulated at higher solid contents. That permits the applicator of the paint composition of this invention to achieve the desired dry film thickness in a shorter period of time. And finally, the block copolyetherpolyols used in the practice of this invention become part of the film deposited on the substrate by the paint composition, and has been found to exhibit improved resistance to oxidative yellowing as compared to conventional water borne paint compositions. Thus the paint compositions of the present invention can be formulated to provide more consistent color, including whiter baked enamels.

DETAILED DESCRIPTION OF THE INVENTION

In accordance with the practice of the invention, it has been found that a portion of the film forming binders used in conventional water borne paint compositions may be replaced with a solvent and/or coalescent in the form of a block copolymer of a polyol and an alkylene oxide. Such block copolymers are copolyetherpolyols that act as non-volatile solvents for water-soluble resins used in such paint compositions and as coalescing agents for acrylic latexes. Because they contribute little to the viscosity of the composition, they do not contribute higher viscosity as is the case with ordinary water soluble resins conventionally used in water borne paint compositions. On the other hand, the copolyetherpolyols can be considered as solids in the paint composition because they react during the bake cycle to become part of the dried film. And, they are less susceptible to oxidative yellowing as compared with many alkyd resins conventionally used in water borne paint compositions.

It is necessary to employ copolymers as distinguished from homopolymers to insure that the copolyetherpolyols employed in the practice of this invention have a balance between hydrophilicity and hydrophobicity. It has been found, for example, that poly(ethylene glycol) homopolymers may, under some conditions, be too hydrophilic to serve as a solvent or as a coalescent for film forming resin systems, while poly(propylene glycol) homopolymers may be too hydrophobic for use in many aqueous systems.

As the block copolymers, use is preferably made of a block copolymer that may be represented by the designation ABA wherein A represents a block formed of a poly (alkylene glycol) and preferably poly(ethylene glycol) while B represents a block of another polyetherpolyol. In the preferred practice of the invention, the polyetherpolyol can be derived from a $C_3$ to $C_5$ alkylene glycol such as propylene glycol, butylene glycol and the like, or it may be a polyetherpolyol which is derived by reacting an alkylene oxide with a polyfunctional polyol. Included in the latter category are glycerine, trimethylol propane and other aliphatic polyols containing 2 to 6 carbon atoms and 2 to 4 hydroxy groups per molecule which have been reacted with a alkylene oxide in accordance with conventional techniques. When using a polyetherpolyol produced by reaction of a alkylene oxide with a polyfunctional polyol, use is typically made of those polyetherpolyols containing 2 to 20 alkylene units per molecule of the polyfunctional polyols.

In the most preferred embodiment of the invention, it is frequently preferred to employ block copolymers of poly (ethylene glycol) as the A block and blocks of poly (propylene glycol) as the B block. In general, it is preferred that the molecular ratio of the B block range from about 0.07 to about 0.93 per molecule of the A block. The copolyetherpolyols employed in the practice of the present invention typically have molecular weights within the range of about 300 to 6,000. For most paint compositions, it is preferred to use copolyetherpolyols having molecular weights within the range of about 400 to 600. Such polyetherpolyols are well known to those skilled in the art and may be prepared as described U.S. Pat. Nos. 4,764,567, 4,195,167, 3,776,862, 3,036,118, 2,677,700 and the like.

In lieu of block copolymers having the structure ABA, it is also possible, and sometimes desirable, to employ block copolymers of other sequences. For example, it is likewise possible to use block copolymers having the sequence BAB or AB. It is generally preferred, however, that the blocks contain terminal ethylene glycol groups; those groups contain hydroxyl groups that are appreciably more reactive than secondary hydroxyl groups.

As the film forming resin employed in the practice of the present invention, use can be made of a variety of film forming binders which have conventionally been used in the past in formulating water borne paint compositions. Such resins are recognized in the art as cross-linkable water soluble or water dispersable resins and include alkyd resins, acrylic resins, polyester resins, polyurethane resins, polyepoxide resins and combinations thereof. The copolyetherpolyol employed in the practice of this invention is thus used in conventional water borne paint compositions to replace a part of the resin component. The amount of copolyetherpolyol employed can vary considerably, depending upon the use to which the paint composition is to be put. In general, it is generally preferred that the copolyetherpolyol employed in the practice of this invention be present in amounts ranging from about 5% to about 50% by weight based upon the total weight of resin solids, and preferably 10% to 30% by weight.

The paint composition of the present invention is also formulated to include a cross-linking agent which has the capability of cross-linking not only film forming resin components, but also promoting cross-linking of the copolyetherpolyol so that it becomes a part of the dried film upon baking of the paint composition. Various cross-linking agents may be employed for that purpose and preferably cross-linking agents which have the capability of reacting with polyols to bond the polyols to the resin component to insure that the copolyetherpolyol becomes part of the film on baking. Cross-linking agents have achieved wide-spread acceptance in such systems including melamine and urea-formaldehyde cross linking agents which are well known to those skilled in the art.

An important concept of the present invention is that the cross-linking agent be present in an amount sufficient to cross-link, not only the resin component of the paint composition, but the copolyetherpolyol component as well to insure that the copolyetherpolyol becomes a part of the film on baking of the paint. The optimum amount of cross-linking agent may vary, depending upon the particular film forming resin employed as well as the particular copolyetherpolyol employed, and the manner in which the paint is to be used.

In general, the amount of the cross-linking agent which should be employed is equal to the weight of the copolyetherpolyol plus 10% of the cross-linkable resins present in the system as the optimum amount. Thus, the optimum amount of cross-linking agent can be calculated by means of the following equation: $C=P+0.1R$ wherein C is the weight of the cross-linking agent, P is the weight of the copolyetherpolyol and R is the total weight of the cross linkable resins present in the system. For alkyd and thermo-setting acrylic resins, the upper limit of the amount of cross-linking agent may be defined by the following equation: $C_{max}=1.8 (P+0.1R)$ while the minimum amount of cross-linking agent, $C_{min}$ can be expressed by the following equation: $C_{min}=0.6 (P+0.1R)$.

For example, for a paint containing 100 grams of alkyd resins, 60 grams of thermo-setting acrylic resin and 40 grams of a copolyetherpolyol, the amount of cross-linking agent such as melamine or urea-formaldehyde cross-linking agent would be calculated by the following: 40 g+0.1×100 g+0.1×60g or 56 grams as the optimum amount of cross-linking agent. By the same token, the maximum and minimum amounts of cross-linking agent preferably employed would range from 100.8 grams to 33.6 grams.

For other cross-linkable resins, such as polyesters, polyurethanes, polyepoxides or poly(expoxy ether) resins, the amount of the optimum cross-linking agent would be calculated in the same manner. Such resins can use a broader range in the amount of cross-linking agent which may be used. $C_{max}$ for such resins can be calculated using the following equation: $C_{max}=2.1(P+0.1R)$ while the minimum amount of cross-linking agent can be calculated as: $C_{min}=0.6(P+0.1R)$.

Thus, a paint containing 100 grams of a water-dispersed polyester resin and 10 grams of a copolyetherpolyol would contain 20 grams of cross-linking agent while the maximum and minimum amounts would range from 12 to 42 grams.

As will be appreciated by those skilled in the art, the paint composition of the present invention may also be formulated to include conventional additives in such paint compositions. Such components generally include a pigment to impart the desired coloration to the paint as well as various stabilizers or leveling agents, antioxidant, and the like. Because such components are conventional, they will not be described in detail.

Having described the basic concepts of the invention, reference is now made to the following examples which are provided by way of illustration but not by way of limitation of the practice of the invention. In each of the examples, for purposes of simplicity, the copolyetherpolyol employed is an ABA diol in which the A block is derived from poly (ethylene glycol) in which the total —$CH_2CH_2O$— is 10 mole % and the block B is a poly(propylene glycol) in which the —$CH_2CH(CH_3)O$— constitutes 90 mole %; the block copolymer has an average molecular weight of about 500.

Example 1
Flat, White, Alkyd Melamine Paint

| | | Wt % in Paint | |
|---|---|---|---|
| Component | | Paint A | Paint B |
| Commercial alkyd resin solution, 72% active | | 10.21 | 4.05 |
| Butyl carbitol | | 1.61 | 0 |
| Isopropanol | | 1.61 | 0.94 |
| ABA diol | | 0 | 2.83 |
| Dimethylethanolamine (DMEA) | | 0.62 | 0.56 |
| Talc | | 9.91 | 11.58 |
| Water | | 34.08 | 28.14 |
| Methoxymethylmelamine | | 0.80 | 3.77 |
| Dispersions | | | |
| 1. | Leveling agent, resin; DMEA, water | 0.22 | 0.25 |
| 2. | Antioxidant, resin, water, DMEA, solvents | 0.36 | 0.42 |
| 3. | Titanium dioxide, resin, water, methoxymethylmelamine, DMEA, solvents | 38.05 | 44.47 |
| 4. | Lampblack, resin, water, DMEA, solvents | 0.02 | 0.02 |
| 5. | Yellow iron oxide, resin, DMEA, water, solvents | 0.04 | 0.05 |
| 6. | Bentone, resin, water, DMEA, solvents | 2.48 | 2.90 |
| % active alkyd | | 15.2 | 11.9 |
| % methoxymethylmelamine | | 1.5 | 4.6 |
| % ABA diol | | 0 | 2.8 |
| Pigment/binder | | 1.04 | 1.04 |
| Viscosity, #2 Zahn cup | | 64 sec | 66 sec |
| VOC sans water, lbs/gal | | 2.78 | 2.16 |
| Volume percent solids | | 29% | 36% |
| Overbake yellowing | | greater | less |

After normal baking at 325° F. for 12 minutes, the two coatings had the same color. The coating from Paint A yellowed more upon overbaking at 375° F. for 12 minutes (DB=−3.93, Paint A yellower), and it darkened more (DL= 0.66, Paint A darker). Paint B exhibited no deficiencies or disadvantages in performance or raw material cost.

Example 2
Semigloss, White, Alkyd Melamine Paint

| | | Wt % in Paint | |
|---|---|---|---|
| Component | | Paint C | Paint D |
| Commercial alkyd resin solution, 45% active including water, solvents, DHEA | | 12.41 | 6.67 |
| Butyl carbitol | | 1.39 | 0 |
| Isopropanol | | 1.39 | 0.75 |
| ABA diol | | 0 | 1.49 |
| Dimethylethanolamine (DMEA) | | 0.15 | 0.12 |
| Talc | | 6.87 | 7.39 |
| Water | | 26.50 | 26.95 |
| Methoxymethylmelamine | | 0.62 | 2.16 |
| Dispersions | | | |
| 1. | Leveling agent, resin, DMEA, water | 0.12 | 0.13 |
| 2. | Antioxidant, resin, water, DMEA, solvents | 0.33 | 0.35 |
| 3. | Titanium dioxide, resin, water, methoxymethylmelamine, DMEA, solvents | 47.63 | 51.21 |
| 4. | Lampblack, resin, water, DMEA, solvents | 0.03 | 0.03 |
| 5. | Yellow iron oxide, resin, DMEA, water, solvents | 0.06 | 0.07 |
| 6. | Bentone, resin, water, DMEA, solvents | 2.48 | 2.67 |
| % active alkyd | | 15.2 | 14.9 |
| % methoxymethylmelamine | | 1.5 | 3.1 |
| % ABA diol | | 0 | 1.5 |
| Pigment/binder | | 1.30 | 1.30 |
| Viscosity, #2 Zahn cup | | 68 sec | 68 sec |
| VOC sans water, lbs/gal | | 2.87 | 2.35 |
| Volume percent solids | | 30% | 33% |
| Overbake yellowing | | greater | less |

After normal baking at 325° F. for 12 minutes, the two coatings had the same color. The coating from Paint C yellowed more upon overbaking at 375° F. for 10 minutes (DB=−3.86, Paint C yellower than Paint D). Paint D exhibited no deficiencies or disadvantages in performance or raw material cost.

Example 3
Full Gloss, White, Alkyd Melamine Paint

| | | Wt % in Paint | | |
|---|---|---|---|---|
| Component | | Paint E | Paint F | Paint G |
| Commercial alkyd resin, solvents, water, DMEA, 45% active | | 16.56 | 11.01 | 12.23 |
| Butyl carbitol | | 1.56 | 1.80 | 0 |
| Isopropanol | | 0 | 0 | 2.00 |
| ABA diol | | 0 | 1.85 | 2.06 |
| Dimethylethanolamine (DMEA) | | 0.06 | 0.05 | 0.05 |
| Water | | 23.01 | 16.21 | 9.25 |
| Methoxymethylmelamine | | 0.78 | 2.64 | 2.94 |
| Leveling agent | | 0.02 | 0.02 | 0.03 |
| Dispersions | | | | |
| 1. | Leveling agent, resin, DMEA, water | 0.20 | 0.23 | 0.26 |
| 2. | Antioxidant, resin, water, DMEA, solvents | 0.39 | 0.45 | 0.50 |
| 3. | Titanium dioxide, resin, water, methoxymethylmelamine, DMEA, solvents | 54.39 | 62.19 | 66.83 |
| 4. | Lampblack, resin, water, DMEA, solvents | 0.03 | 0.03 | 0.03 |
| 5. | Yellow iron oxide, resin, DMEA, water, solvents | 0.05 | 0.08 | 0.08 |
| 6. | Red iron oxide, resin, DMEA, water, solvents | 0.03 | 0.03 | 0.03 |

Example 3
Full Gloss, White, Alkyd Melamine Paint

| Component | Wt % in Paint | | |
|---|---|---|---|
| | Paint E | Paint F | Paint G |
| 7. Bentone, resin, water, DMEA, solvents | 2.93 | 3.37 | 3.74 |
| % active alkyd | 18.0 | 19.2 | 18.5 |
| % methoxymethylmelamine | 1.7 | 2.6 | 2.9 |
| % ABA diol | 0 | 1.9 | 2.0 |
| Pigment/binder | 1.22 | 1.22 | 1.21 |
| Viscosity, #4 Zahn cup | 35 sec | 35 sec | 35 sec |
| VOC san water, lbs/gal | 2.89 | 2.66 | 2.64 |
| Volume percent solids | 31% | 37% | 41% |
| Overbake yellowing | greater | less | less |

After normal baking at 325° F. for 12 minutes, the three coatings had the same color. After 12 more minutes of 325° F. overbaking ing, the coating from Paint E yellowed more than those from Paints F and G.

| | Paint E | Paint F | Paint G |
|---|---|---|---|
| Overbake darkening DL | −3.04 | −1.26 | −1.10 |
| Overbake yellowing DB | 8.13 | 2.96 | 3.43 |
| Overbake color change DE | 8.68 | 3.23 | 3.61 |

Paints F and G exhibited no deficiencies or disadvantages in performance or raw material cost.

Example 4
Yellow-Tan, Alkyd Melamine Paint

| Component | Wt % in Paint | |
|---|---|---|
| | Paint H | Paint I |
| Commercial alkyd resin, solvents, water, DMEA, 45% active resin | 25.15 | 19.05 |
| Butyl carbitol | 1.15 | 1.08 |
| Isopropanol | 1.15 | 0.71 |
| ABA diol | 0 | 2.09 |
| Talc | 4.67 | 5.02 |
| Water | 22.17 | 21.07 |
| Methoxymethylmelamine | 2.02 | 3.91 |
| Dispersions | | |
| 1. Leveling agent, resin, DMEA, water | 0.05 | 0.06 |
| 2. Titanium dioxide, resin, water, methoxymethylmelamine, DMEA, solvents | 6.68 | 7.19 |
| 3. Hostaperm red, resin, water, DMEA, solvents | 0.74 | 0.80 |
| 4. Yellow iron oxide, resin, DMEA, water, solvents | 34.49 | 37.14 |
| 5. Bentone, resin, water, DMEA, solvents | 1.75 | 1.88 |
| % active alkyd | 21.0 | 18.7 |
| % methoxymethylmelamine | 2.0 | 3.9 |
| % ABA diol | 0 | 2.1 |
| Pigment/binder | 0.48 | 0.49 |
| Viscosity, #2 Zahn cup | 64 sec | 58 sec |
| VOC sans water, lbs./gal | 2.93 | 2.63 |
| Volume percent solids | 26% | 28% |
| Overbake yellowing | greater | less |

After normal baking at 325° F. for 12 minutes, the two coatings had the same color. The coating from Paint H darkened more and changed color more upon overbaking at 325° F. for 39 minutes.

| | Paint H | Paint I |
|---|---|---|
| DL | −1.54 | −1.06 |
| DE | 3.29 | 2.68 |

Paint I exhibited no deficiencies or disadvantages in performance or raw material cost.

Example 5
"Pure" White, Acrylic-Modified, Alkyd Melamine

| Component | Wt % in Paint | |
|---|---|---|
| | Paint J | Paint K |
| Commercial alkyd resin solution, 45% active including solvents, water, DMEA | 13.83 | 0 |
| ABA diol | 0 | 3.86 |
| Commercial thermosetting acrylic, 45% active | 11.38 | 12.82 |
| Water | 24.14 | 22.97 |
| Methoxymethylmelamine | 1.1 | 4.47 |
| Dispersions | | |
| 1. Leveling agent, alkyd resin, DMEA, water | 0.02 | 0.03 |
| 2. Titanium dioxide, alkyd resin, water, methoxymethylmelamine, DMEA, solvents | 49.52 | 55.85 |
| % active alkyd | 15.1 | 10.0 |
| % active acrylic | 5.1 | 5.8 |
| % methoxymethylmelamine | 2.0 | 5.5 |
| % ABA diol | 0 | 3.9 |
| Pigment/binder | 1.00 | 1.00 |
| VOC sans water, lbs/gal | 2.32 | 1.85 |
| Volume percent solids | 32% | 38% |
| Overbake yellowing | greater | less |

Although the pigmentations of Paints J and K were identical, Paint K was whiter after normal baking at 325° F. for 12 minutes.

| | L | B |
|---|---|---|
| Paint J | 92.39 | 4.41 |
| Paint K | 92.93 | −1.45 |
| | DE = | 5.92 |

Upon subsequent overbaking at 375° F. for 15 minutes, Paint J exhibited more yellowing than Paint K.

| | DB | DE |
|---|---|---|
| Paint J | 10.4 | 10.6 |
| Paint K | 2.4 | 2.6 |

Paint K exhibited no deficiencies or disadvantages in gloss, performance, or raw material cost.

Example 6
Low-VOC, Grey, Polyester/Acrylic

| Component | Paint L Relative Amount |
|---|---|
| 35% active commercial polyester dispersion | 546. |
| 36% active commercial thermoplastic acrylic emulsion | 186. |
| ABA diol | 18. |

-continued

Example 6
Low-VOC, Grey, Polyester/Acrylic

| Component | Paint L<br>Relative Amount |
|---|---|
| Methoxymethylmelamine | 76. |
| Dimethylethanolamine | 5.5 |
| Water | 55. |
| Titanium dioxide | 109. |
| Carbon black | 5.5 |
| Viscosity: 26 sec, #2 Zahn | |
| VOC sans water: 0.51 lbs/gal | |
| Resin Ratio: | |
| 191 parts polyester (67.0% of thermosetting resin) | |
| 76 parts methoxymethylmelamine (26.7% of thermosetting resin) | |
| 18 parts ABA diol (6.3% of thermosetting resin) | |

Additionally, there are 67 parts of thermoplastic acrylic, for which no additional cross-linking resin is required.

The above composition, containing no conventional coalescing solvents, was ground by shaking with glass beads. It yielded a paint that produced smooth, glossy films after baking at 325° F. for 15 minutes. The coatings had good humidity, resistance, salt spray resistance, hardness and impact strength.

Example 7
Very Low-VOC, Grey Acrylic

| Component | Paint M<br>Relative Amount |
|---|---|
| 45% active commercial thermosetting acrylic emulsion, with DMEA | 595. |
| ABA diol | 71. |
| Methoxymethylmelamine | 95. |
| Water | 107. |
| Titanium dioxidemine | 119 |
| Carbon black | 12. |
| Viscosity: 39 sec, #2 Zahn | |
| VOC sans water: 0.09 lbs/gal | |
| Volume percent solids: 49% | |
| Resin Ratio: | |
| 268 parts thermosetting acrylic (61.8% of binder) | |
| 95 parts methoxymethylmelamine (21.9% of binder) | |
| 71 parts ABA diol (16.4% of binder) | |

The above composition, containing no conventional coalescing solvents, was ground by shaking with glass beads. It yielded a paint that produced smooth, glossy films after baking at 325° F. for 30 minutes. This paint required higher bake temperature or, longer bake times than the paints in Examples 1 through 5, but the fully cured coatings had good humidity and salt spray resistance, hardness, and impact strength.

It will be understood that various changes and modifications can be made in the details of procedure, formulation and use without distracting from the spirit of the invention, especially as defined in the following claims:

What is claimed is:

1. A water borne, bakable paint composition having a reduced VOC comprising:
   (a) a dispersion of at least one water-compatible, film forming, cross linkable resin;
   (b) a solvent for the resin, wherein said solvent is in the form of a tri-block copolymer of (1) a polyetherpolyol derived from a $C_3$ to $C_5$ alkylene glycol or an alkylene oxide reacted with a polyfunctional polyol and (2) another polyetherpolyol; and
   (c) a cross-linking agent for the resin and the tri-block copolymer wherein the film forming resin is select-ed from the group consisting of an alkyd resin and an acrylic resin and the amount of cross-linking agent ranges from a maximum calculated by the formula $C_{max}=1.8(P+0.1R)$ to a minimum calculated by the formula $C_{max}=0.6(P+0.1R)$ wherein P is the weight of the tri-block co-polymer and R is the total weight of the cross-linkable resin with the cross-linking agent being present in an amount sufficient to cross-link the resin and the block copolymer whereby the block copolymer becomes part of the film on baking of the paint.

2. A composition as defined in claim 1 wherein the block copolymer is an ABA block copolymer in which A represents a block formed of a polyalkylene glycol and B represents a block of another polyetherpolyol.

3. A composition as defined in claim 2 wherein the block B is a polyetherpolyol derived from a $C_3$ to $C_5$ alkylene glycol.

4. A composition as defined in claim 2 wherein the block B is derived from a polyetherpolyol formed by reacting an alkylene oxide with an aliphatic polyol containing 2 to 6 carbon atoms and 2 to 4 hydroxy groups per molecule.

5. A composition as defined in claim 1 wherein the block copolymer is a block ABA in which A is a block of poly(ethylene glycol) and B is a block of poly(propylene glycol).

6. A composition as defined in claim 1 wherein the block copolymer is present in an amount from about 5% to about 50% based on the total weight of the resin solids.

7. A composition as defined in claim 1 wherein the block copolymer is present in an amount from about 10% to about 30% based on the total weight of the resin solids.

8. A composition as defined in claim 1 wherein the cross-linking agent is melamine.

9. A composition as defined in claim 1 wherein the cross-linking agent is urea-formaldehyde.

10. A water borne, bakable paint composition having a reduced VOC comprising:
    (a) a dispersion of at least one water-compatible, film forming, cross linkable resin;
    (b) a solvent for the resin, wherein said solvent is in the form of a tri-block copolymer of (1) a polyetherpolyol derived from a $C_3$ to $C_5$ alkylene glycol or an alkylene oxide reacted with a polyfunctional polyol and (2) another polyetherpolyol; and
    (c) a cross-linking agent for the resin and the tri-block copolymer wherein the film forming resin is selected from the group consisting of polyesters, polyurethanes, polyepoxides and combinations thereof, and the amount of cross-linking agent ranges from a maximum calculated by the formula 2.1 (P+0.1R) to a minimum of 0.6 (P+0.1R) wherein P is the weight of the tri-block copolymer and R is the weight of the resin with the cross-link linking agent being present in an amount sufficient to cross-link the resin and the block copolymer whereby the block copolymer becomes part of the film on baking of the paint.

11. A composition as defined in claim 10 wherein the block copolymer is an ABA block copolymer in which A represents a block formed of a polyalkylene glycol and B represents a block of another polyetherpolyol.

12. A composition as defined in claim 11 wherein the block B is a polyetherpolyol derived from a $C_3$ to $C_5$ alkylene glycol.

13. A composition as defined in claim 11 wherein the block B is derived from a polyetherpolyol formed by reacting an alkylene oxide with an aliphatic polyol containing 2 to 6 carbon atoms and 2 to 4 hydroxy groups per molecule.

14. A composition as defined in claim 10 wherein the block copolymer is a block ABA in which A is a block of poly(ethylene glycol) and B is a block of poly(propylene glycol).

15. A composition as defined in claim 10 wherein the block copolymer is present in an amount from about 5% to about 50% based on the total weight of the resin solids.

16. A composition as defined in claim 10 wherein the block copolymer is present in an amount from about 10% to about 30% based on the total weight of the resin solids.

17. A composition as defined in claim 10 wherein the cross-linking agent is melamine.

18. A composition as defined in claim 10 wherein the cross-linking agent is urea-formaldehyde.

* * * * *